Dec. 24, 1968  F. W. ROHE ET AL  3,417,803
MOLDABLE INSERT HAVING POSITIONING MEANS
FOR INSTALLATION IN SANDWICH PANEL
Original Filed April 20, 1962  2 Sheets-Sheet 1
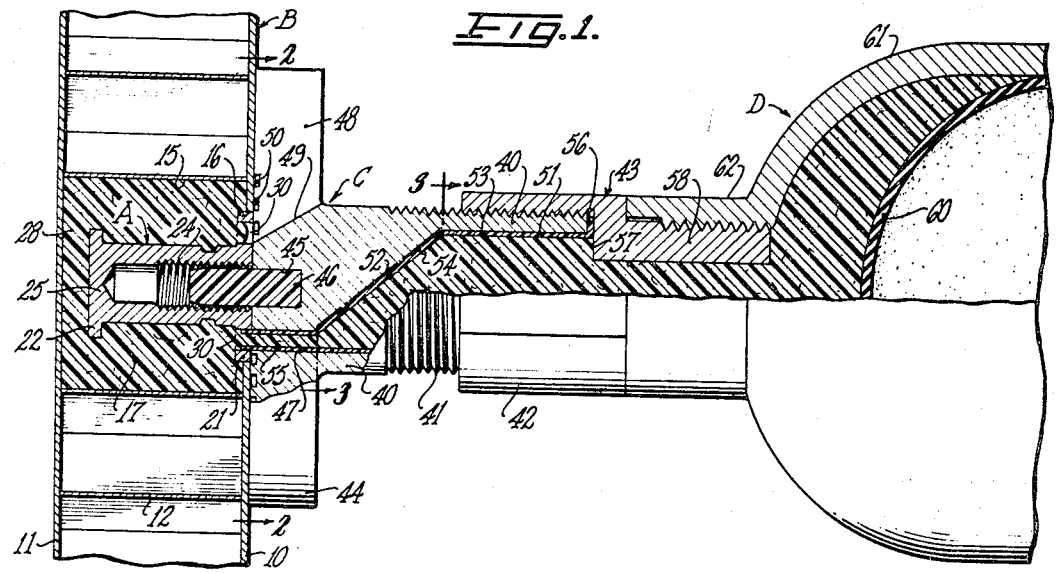
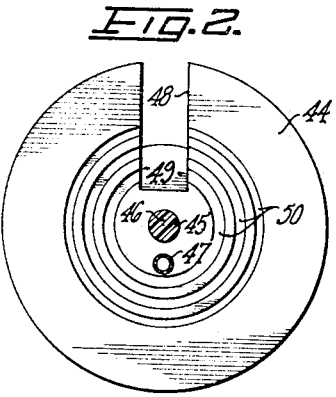
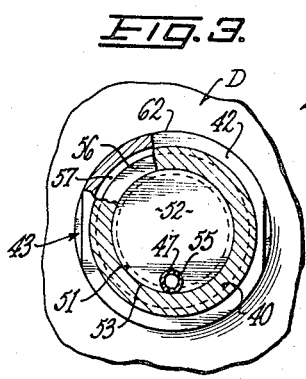
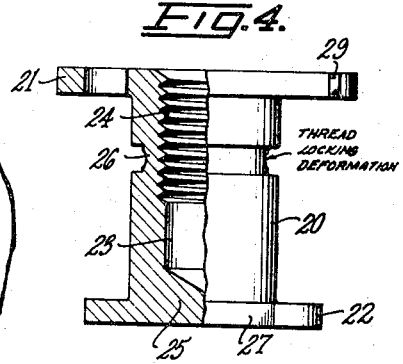
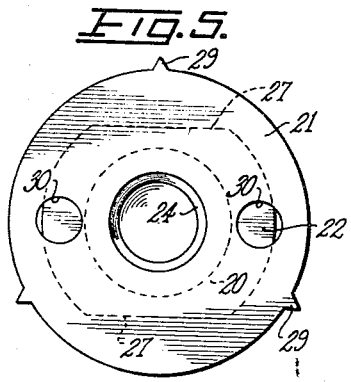
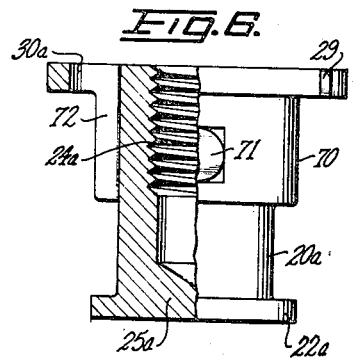
INVENTORS
FREDERICK W. ROHE
CHARLES S. PHELAN
BY
*Lynn T. Latta*
ATTORNEY

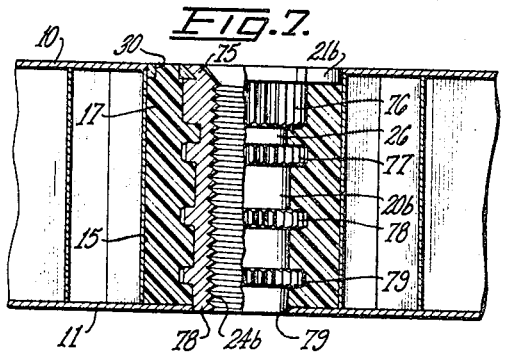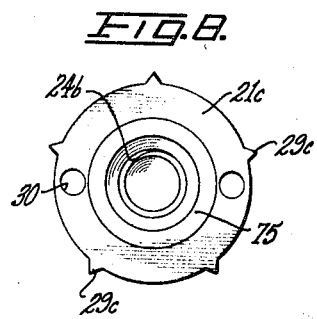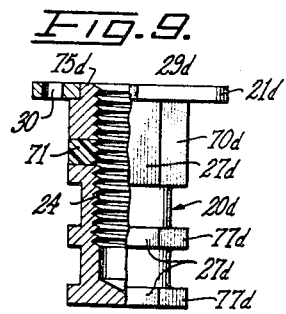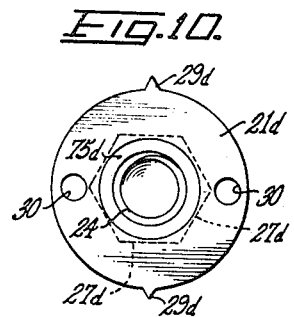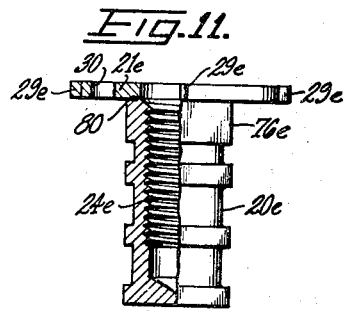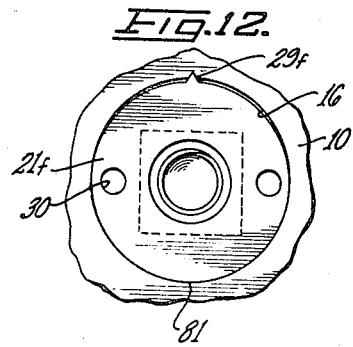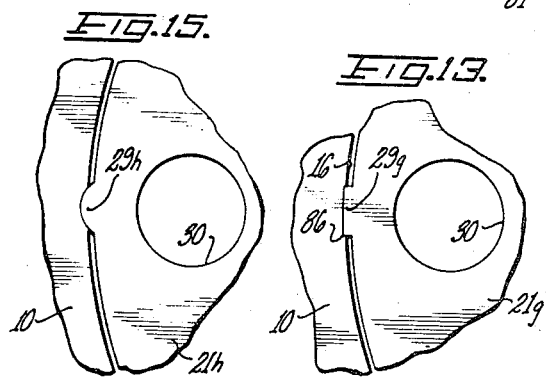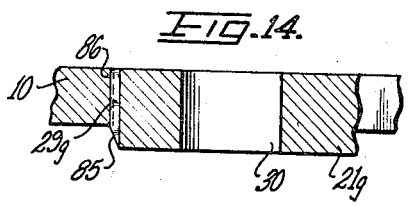

United States Patent Office 3,417,803
Patented Dec. 24, 1968

3,417,803
MOLDABLE INSERT HAVING POSITIONING MEANS FOR INSTALLATION IN SANDWICH PANEL
Frederick W. Rohe, Placentia, and Charles S. Phelan, Tustin, Calif., assignors to Shur-Lok Corporation, Santa Ana, Calif., a corporation of California
Original application Apr. 20, 1962, Ser. No. 189,194, now Patent No. 3,282,015, dated Nov. 1, 1966. Divided and this application Sept. 6, 1966, Ser. No. 596,029
10 Claims. (Cl. 151—41.73)

ABSTRACT OF THE DISCLOSURE

A fastener insert for potted anchorage in a lightweight sandwich panel, having a tubular body to receive a fastener stud and a flat radial flange head provided on its periphery with a number of small circumferentially-spaced projections adapted, under axial pressure, to pierce and become slightly embedded in the edge of an aperture in a skin of the panel, without warping the panel skin, such opening forming the mouth of a hole in which the insert is embedded in potting material, the projections temporarily holding the insert in place while potting material is inserted through a port in the insert head and allowed to harden so as to permanently anchor the insert in the panel.

---

This application is a division of application Ser. No. 189,194, filed by these applicants Apr. 20, 1962 now Patent No. 3,282,015, for Moldable Insert Fastener Assembly and Method and Means for Installation Thereof; and is related to application Ser. No. 340,212, filed Jan. 27, 1964, now Patent No. 3,271,498, issued Sept. 6, 1966, for Method of Installation of Moldable Insert in Sandwich Panel.

Summary of invention

The invention relates to fastener inserts for lightweight, fragile-core sandwich panels, of the type known in the trade as a "molded insert fastener," having a head in the form of a flat disc and a tubular body for reception of a fastener part such as a screw, adapted to be anchored by means of a surrounding molded body of solidified resin potting material, within a hole bored through a skin sheet on one side of the panel and through the core, terminating adjacent the opposite skin sheet. The invention provides on the insert head a plurality of circumferentially spaced projections, adapted to be embedded in the skin-sheet margin of the mouth of a potting hole in such a panel, so as to temporarily position the insert properly in the potting hole, while potting compound is injected into the hole through the insert head, and while the compound hardens into a solid supporting body which firmly anchors the insert to the panel, thus releasing the compound-injector gun for use in installing additional inserts while the compound is setting. The holding projections are sufficiently few in number and widely spaced to avoid crushing or deforming the skin-sheet margin during insertion of the insert.

Background of the invention

The most common insert of this general type is one in which the insert head is freely receivable in the circular aperture of the bored skin sheet, with its outer face exactly flush with the outer surface of such skin sheet, and with no direct mechanical connection between the head and the skin sheet itself. Such an insert however, has for many years presented problems of installation for which a more satisfactory solution than those hitherto available, has been greatly needed.

The general object of this invention is to provide such an insert having improved means for temporarily positioning and holding it in the panel hole with the insert head flush with the bored skin sheet. In the past, the common method of installing such insert has been to fill the hole with a measured quantity of resin (e.g., epoxy) in liquid condition, mixed with a curing agent; to then project the insert into the hole until its head is fitted in the skin sheet aperture; and to then hold it in that position while the resin sets. Accurate positioning of the head in the plane of the apertured skin sheet so as to position the insert axis normal to the skin sheet, is required in order that satisfactory attachment of other parts to the panel can be established through the insert, and this can be accomplished by utilizing a suitable installation tool. However, in using such a tool to hold the insert in its proper position until the resin has set sufficiently to hold the insert, the operation is time-consuming and therefore expensive in labor cost.

In addition to the flush-head insert referred to above, the prior art has also provided an insert of a "snap-in" type, having a thicker head with an annular groove in its periphery to receive the margin of the skin sheet aperture, and having a frusto-conical expander shoulder leading up to the groove, and adapted when forced through the skin sheet aperture, to stretch the margin of the aperture sufficiently to snap through the aperture and seat the aperture margin in the annular groove of the insert head. However, we have found that in many instances the stresses thus set-up in the skin sheet around the aperture will cause the surrounding area of the skin sheet to warp and in some cases the insert will consequently be mounted in a position deviating somewhat from a true perpendicular relation to the surrounding skin sheet. In all cases, the insert head will project beyond the plane of the skin sheet, since it embodies a flange of substantial thickness defining the outer side of its annular peripheral groove, which outer flange overlaps the skin sheet. For these reasons, the insert with the flush-type head has been the preferred type, despite the much more difficult problems of rapid installation of this type than in the installation of the snap-in type.

In an effort to improve the earlier method of installing the flush-type insert by reducing the number of steps required therein, the art has more recently provided an improvement therein, involving the use of an insert with a port in its flush head, and the injection of the liquid resin from a gun through such port while the insert is held, by a suitable attachment to the gun, in a position centered in the hole in the panel and with its head received in flush relation in the skin sheet aperture. Here again, in using the gun to hold the insert temporarily in place, the gun is immobilized until the resin has set sufficiently to permit removal of the gun, and the need for a faster method of installing the flush-head insert has endured throughout that stage of development of the art.

Description of the invention

Our invention involves the concept of combining the advantages of the flush-type head and of the direct supporting connection between head and skin sheet, with those of the snap-in insert. A specific and important object of our invention is to provide an insert having a head adapted for installation in a skin sheet aperture in flush relation, and also having means for effecting a direct attachment of such head to the skin sheet with sufficient retention to temporarily hold it securely during the injection of the fluid resin.

A further object of the invention is to provide an improved insert having resin-injection means through which the panel hole can be completely filled with the liquid resin without leaving air pockets therein and can be accurately filled without extruding resin past the insert head, whereby the necessity for cleaning away extruded excess resin is eliminated.

Other objects and advantages will become apparent in the ensuing specifications and appended drawing in which:

FIG. 1 is a fragmentary sectional view of a sandwich panel; an insert in the process of being installed therein; our improved gun nozzle utilized in such installation; and its connection to an extrusion gun;

FIG. 2 is an end view of the face of the gun nozzle;

FIG. 3 is a sectional view of the gun nozzle taken on the line 3—3 of FIG. 1, viewing the front end of the liner in end elevation;

FIG. 4 is a side elevational view, partially in axial section, of a preferred form of our improved insert;

FIG. 5 is a head end view of the same;

FIG. 6 is a side elevational view, partially in section, of a modified form of the insert;

FIG. 7 is a sectional view of a fragment of a sandwich panel embodying a modified form of our improved insert;

FIG. 8 is an end view of a modified form of the insert;

FIG. 9 is a side elevational view, partially in axial section, showing another modified form of the insert;

FIG. 10 is an end view of the same;

FIG. 11 is a side elevational view, partially in axial section, showing a further modified form of the insert;

FIG. 12 is an end view of another modified form of the insert, as installed in a panel;

FIG. 13 is a fragmentary end view of another modified form of the insert as installed in a panel, shown on a greatly magnified scale;

FIG. 14 is a fragmentary axial sectional view of the same; and

FIG. 15 is a fragmentary end view of another modified form of the insert as installed in a panel.

General description

Referring now to FIG. 1 of the drawings, we have shown therein, as an illustrative example, one of our improved inserts, indicated generally at A, in the process of being installed in a sandwich panel B by an injection nozzle C attached to a gun D. The details of the gun do not form any part of the present invention and accordingly, only enough of the gun to illustrate the attachment of the nozzle C thereto, is shown. The sandwich panel B, shown by way of illustration of the general type of panel to which the invention may be applied, is one wherein spaced skin sheets 10 and 11 are united to the edges of a series of honeycomb cells constituting the lightweight, fragile core 12 of the panel. The core 12 may be fabricated of thin metal foil, of impregnated paper, or other equivalent material. The skin sheets 10 and 11 may be sheet metal (e.g., thin aluminum sheet) or may be of hard plastic or hard fibre (resin-impregnated paper) suitably bonded to the edges of the core cells by a suitable cement or other equivalent material.

In general, the invention provides for the preliminary insertion of the insert A into a hole bored through the skin sheet 10 and substantially through the core 12, resulting in a cavity 15 in the core which includes an annular series of pockets surrounding a bored cylindrical central area. Where the bored hole passes through the skin sheet 10, a circular aperture 16 is provided, the peripheral pockets of cavity 15 projecting radially beyond the aperture 16.

The invention provides, in the insert A, a circular disc head of slightly smaller diameter than the aperture 16, receivable therein with a sufficiently close fit to function as a stopper closing the aperture, and provided with means for temporarily securing the same to the margin of aperture 16 pending the injection of potting compound 17 to fill the cavity 15.

The nozzle C may be used as the tool for pressing the insert into place in the panel hole, having means for mounting the insert thereon in coaxial relation thereto and having means for locating against the outer surface of skin sheet 10 to position the head of the insert in accurately flush relationship to the skin sheet when the head has been pressed into place in aperture 16, although a separate installation tool can be employed for this step. After the insert has been pressed into position, the nozzle C functions to inject the potting compound 17 through the insert head into the cavity 15, and when the cavity is filled, the nozzle can be withdrawn, leaving the insert self-supported in the aperture 16 during the period required for curing of the potting compound 17. The nozzle C has a self-cleaning feature which will be described hereinafter.

Detailed description

The insert A, in a preferred form (FIGS. 4 and 5) comprises a tubular body 20, which may be cylindrical as shown, a mounting head 21 in the form of an integral flat circular radial flange on one end of body 20, and an anchor head 22 of smaller radius, in the form of an integral radial flange on the other end of body 20. The body 20 has a bore 23 which preferably is internally threaded at 24 for at least a portion of its length, and may have a closed bottom defined by an integral central portion 25 of anchor head 22.

With the internal thread 24, the insert body 20 functions as a nut to receive a screw inserted through the mounting head 21, and the body 20 is provided with a suitable thread lock which, in the particular form of the invention shown in FIG. 4, is embodied in a radially inward deformation (so labelled in FIG. 4) of a reduced thickness neck 26 in an intermediate portion of body 20, the neck being defined by an external annular groove in the body 20.

Preferably, the anchor head 22 has a non-circular periphery which may have varying configurations as more specifically described hereinafter, but which, in the particular form shown in FIG. 4, is provided with one or more flat faces 27 interrupting an otherwise circular periphery. Thus, the head 22 may comprise a pair of diametrically opposed flats 27 and a pair of intervening circular segments of periphery. The flats 27 interlock with the potting compound 17 to lock the inert in the panel against rotation in response to torque forces imposed thereon during the insertion and removal of a screw. In the installed assembly shown in FIG. 1, the head 22 is spaced from the skin sheet 11 by a space which is filled by a layer 28 of potting compound, providing an adhesive conection between the head 22 and the skin sheet 11.

Attachment of mounting head 21 to skin sheet 10 is provided for by one or more small radial anchor teeth 29 on the otherwise circular periphery of the head. Teeth 29 have a height somewhat greater than the clearance space between the periphery of head 21 and the skin sheet aperture 16, so as to intersect and embed themselves in the aperture margin when the insert head is forced into the aperture. However, they are of sufficiently small volume so as to pierce the aperture margin without causing the skin sheet to become warped or depressed below its own plane. For example, where the insert head 21 has a diameter of one half inch and a clearance of .005 inch between its periphery and the margin of aperture 16, the mounting teeth 29 may have a radial height approximately in the range of .007 inch to .02 inch. In attaining small volume, the teeth are widely spaced circumferentially, the spaces between them being greater than their circumferential base width (maximum width of a tooth circumferentially). In the preferred form (FIG. 8) the circumferential spacing is several times the base width.

The anchor teeth 29 are preferably of chisel-edge form, with an isosceles-triangular end contour as seen in FIG. 5, so as to enter the aperture 16 with a lancing action in the margin of the aperture, which can be effected by applying relatively light end pressure to the head as it is pushed into the aperture.

In the head 21 are a pair of ports 30, one of which is utilized as an inlet for injection of the potting compound 17 through the head 16, and the other of which functions as a vent for the escape of air from the cavity 15 as it is displaced by the potting compound entering the cavity, and also functions as an inspection port.

Nozzle C comprises a cylindrical barrel 40 having at one end a male thread 41 for coupling into an internally threaded socket 42 of an adaptor fitting 43; and having at its other end an integral anvil 44 in the form of a thick circular coaxial disc which projects as a radial flange from the barrel 40. The barrel and anvil may be fabricated as a casting of aluminum or other suitable material. In the center of anvil 44 is a cylindrical axial bore 45 in which is mounted, by a press-fit, a pilot 46 of a tough, wear-resistant, slightly compressible material such as nylon or polyethylene, having a diameter such as to be received in the internally threaded section 24 of insert A with a close fit such that the insert will engage the pilot with a light (not tight) frictional engagement and be thereby held with its head 21 snugly seated against the front face of anvil 44 when the insert has been pressed onto the pilot.

In the anvil 44, at one side of its center, is an axially extending passage 47. In the opposite side of the anvil is a window 48 in the form of a radial slot having a width at least equal to the diameter of a port 30 which is adapted to be registered with the bottom area of the window 48. The bottom wall 49 of the slot is inclined forwardly toward the axis of the nozzle from the periphery of the barrel 40 where it joins the back face of anvil 44 to a radius at least as close to the axis as the inner extremity of port 30. Thus it becomes possible for the operator to sight through the window 48 during the step of injecting the potting compound into cavity 15, keeping the vent port 30 in full view until the potting compound has filled the cavity 15 and commences to exude through the vent port 30, which will indicate to him that the injection of potting compound is to be arrested.

In the forward face of anvil 44 are a plurality of shallow concentric annular grooves 50 adapted to receive any excess potting compound which may inadvertently be extruded from the vent aperture 30, avoiding the possibility of the compound creeping between the face of the anvil and the insert head 21 and establishing an adhesive bond which might dislodge the insert as the gun is pulled away from the panel.

The barrel 40 defines, within itself, a chamber for the transfer of putting compound from gun D to the panel cavity 15, said chamber including a cylindrical bore 51, a funnel area defined by a wall 52 of assymetrical conical contour, converging uniformly in straight lines from the cross sectional contour of bore 51 to the small cross sectional contour of passage 47. Passage 47 is positioned with its outer side aligned with the cylindrical wall of bore 51. The barrel chamber, and the passage 47, are lined by a thin-walled, disposable plastic liner including a cylindrical portion 53, a conical portion 54 fitted to the funnel wall 52, and a tubular nozzle tip 55 fitted snugly within the passage 47. The rear end of cylindrical body 53 is open and is provided with a radially outwardly projecting flange 56 which is clamped between the rear end of barrel 41 and an off-set radial shoulder wall 57 of adapter fitting 43. Fitting 43 includes an externally threaded neck 58 joined to the socket 42 by the off-set portion which defines radial shoulder wall 57.

The nozzle 55 is of length such as to project beyond the forward face of anvil 44 and into the inlet port 30 of insert head 21 as shown in FIG. 1. The liner 53–55 is preferably of a medium soft plastic material such as polyethylene, such as to conform readily to the wall contours of barrel 41 to receive support therefrom, and such that the tip 55 can be snugly fitted in the inlet port 30 so as to be substantially sealed against back-flow of the potting compound through the inlet port 30.

Gun D may be of any suitable known type having a piston 60 for applying pressure to a body of potting compound contained within the housing 61, and delivered under pressure through an internally threaded collar 62 into the adapter neck 58 threaded into the collar 62.

When a period of use of the gun is terminated, the nozzle unit C is unscrewed from the collar 62, the adapter 43 is removed from the barrel 40, thus exposing the flange 56, the latter is pried loose from the end of barrel 40 and is grasped to withdraw the liner 53–55 from the barrel 40, and the liner with its residual potting compound therein is discarded as waste material. This leaves the internal surfaces of the barrel 40 and passage 47 clean, without any potting compound adhering thereto. The two sections of the nozzle assembly may then be further cleaned in a suitable solvent to remove any vestiges of the potting compound, and so as to be in proper condition for the next period of use. The gun is, of course, cleaned in accordance with conventional practice.

*The method*

Our improved method will now be clearly apparent from a brief review of the installation procedures hereinbefore referred to. In preparing a panel for a series of inserts located on predetermined centers, such centers are marked on the panel, or located by a suitable jig, and a series of holes are then bored in the panel, using a suitable end-cutting boring tool, of the proper diameter to provide bores just slightly larger in diameter than the heads of the inserts that are to be installed.

The gun is then loaded with a prepared liquid mixture of resin and catalyst, the nozzle assembly C is fitted with a fresh liner, its two sections are coupled together, and it is then attached to the gun. In succession, a series of inserts A are attached to the forward face of anvil 44 by pushing the pilot 46 into the threaded bore of each insert and pressing the end face of the insert head 21 into full seating engagement with the face of anvil 44, after first rotating the insert until one of its ports 30 registers with the anvil window 48 and its other port 30 registers with and receives the projecting end portion of nozzle tip 55. Using the gun as a handle, the insert is then projected through a selected aperture 16 and its head 21 fitted in the aperture. End pressure is then applied to force the anchor teeth 29 into the aperture margin, until the forward face of anvil 44 is in full face-to-face contact with the skin sheet 10. This will automatically result in the proper positioning of the insert in coaxial relation to the cavity 15 and with its head 21 in flush relation to skin sheet 10. The gun is then operated to express the potting compound through the nozzle unit C and its tip 55, thence through the inlet port 30 of the insert and into the cavity 15, gradually filling the same. Entrapped air in the cavity will be vented through the vent port 30 and the window 48. During the filling operation, the operator will inspect the vent port 30 through the window 48 until the potting compound appears in the vent port 30, whereupon he will discontinue the injection operation and will promptly pull the gun away from the panel, withdrawing the pilot 46 from the bore of the insert and withdrawing the nozzle 55 from the inlet port 30. The attachment of the head 21 to the skin sheet 10 by the embedding of anchor teeth 29 in the margin of aperture 16 suffices to hold the insert securely in its coaxial, flush position in the panel, without being dislodged by the withdrawal of the parts 46 and 55; and will continue to support the insert in its coaxial, flush position until the potting compound 17 has set sufficiently to provide adequate support. As the potting compound hardens around the insert, it provides a secure interlocking engagement with the insert and with the inner face of skin sheet 10 at the ends of the radially projecting pocket portions of cavity 15, such as to securely resist displacement of the insert from its fixed position in the panel, under the torque load of screwing a fastener screw into the insert, or under axial load transmitted through the screw to the insert from a part that is attached to the panel by the insert.

The converging funnel portion 54 of the nozzle liner is such as to eliminate any corner pockets in which potting compound could escape from the flowing stream of compound passing through the nozzle and harden so as to eventually obstruct the nozzle tip 55. It provides a converging approach from the large cross sectional area of cylindrical portion 53 to the relatively small cross sectional area of nozzle tip 55, wherein all areas are subjected to the scavenging flow of the potting compound through the nozzle and cannot encourage the build-up of a deposit of hardened compound.

*Modified forms of insert*

FIG. 6 illustrates a desirable modification of the insert shown in FIGS. 4 and 5, wherein the tubular insert body 20A has an enlarged shoulder portion 70 having a cylindrical radial bore in which is mounted a locking pellet 71 of a tough, slightly yieldable plastic material such as nylon, having an inner end projecting for interference engagement with the threads of the screw that is threaded into bore 24A. The ports 30A in head 21 have extended portions 72 in the form of channels in opposite sides of shoulder 70, and such channels will be filled by potting material, which, when hardened, will form ribs or keys interlocking with the shoulder 70 to resist torque loads to which the insert may be subjected. In this case, the anchor head 22A may be of plain circular flange form.

FIG. 7 discloses an insert fastener having a number of modified features, any one or more of which can be embodied as modifications in the fasteners are described above. The head 21B may be formed as a separate part in the form of a washer having a countersunk central aperture in which a neck portion 75 of tubular body 20B is secured by swaging outwardly with a conical swaging tool. The body 20B may be a section of splined rod, turned down to leave a selected series of peripherally splined annular anchor heads 76, 77, 78 and 79 in the form of integral collars thereon, with the potting material 17 meshing with the splines of these collars to lock the insert against rotation, and filling the annular grooves between the collars to lock the insert against axial displacement. This particular configuration is especially adaptable for withstanding unusually high torque loads and end loads. FIG. 7 discloses a further modified feature embodying a through bore 24B in the tubular body 20B, and a projecting tail end 78, having a frusto-conical external surface with a slight taper adapted to be wedged in a circular aperture 79 in the skin sheet 11 and to seal therein so as to provide a closed bottom for cavity 15 and to retain the potting material 17 therein.

Between the splined collar portions 77, the tubular nut body 20B may have cylindrical external surfaces. Between the collar portions 76 and 77, it may embody a reduced thickness locking neck 26 as in FIG. 4. The collar portion 76 provides a shoulder against which the head 21B is securely mounted.

FIG. 9 discloses a further modified form of the insert, wherein a separate head 21D is of washer form having a cylindrical central bore closely fitted upon the cylindrical lateral wall of a reduced neck 75D and seated against an annular shoulder defined by the shoulder portion 70D of tubular body 20D. A plurality of annular collars 77D, similar to the collars 77–79 of FIG. 7, may be utilized. FIG. 9 shows a further modified feature which can be utilized in any of the forms shown herein, embodying a series of faces 27D (e.g., of hexagonal array) on one or more sides of the shoulder portion 70D and collars 77D, for torque-resisting interlock with the potting material; and with annular grooves between the collars 77D and shoulder portion 70D, for end load-resisting interlock with the potting material. FIG. 9 also disclose a nylon pettet type thread lock 71, as in FIG. 6.

FIG. 10 illustrates the possibility of reducing the preferred number of three anchor teeth down to a lesser number, two being shown at 29D on the periphery of head 21D.

FIG. 11 illustrates a further possible modification of the insert, wherein the head 21E is in the form of a flat washer having a plain cylindrical central opening providing the mouth of threaded bore 24E, and having a butt-welded connection, at 80, to the squared end of the shoulder portion 76E of tubular body 20E. FIG. 11 also illustrates the possibility of utilizing four of the anchor teeth 29A.

FIG. 12 illustrates the possibility of utilizing a single anchor tooth 29F, embedded in one side of the margin of aperture 16 in sheet 10, with the diametrically opposite side of the circular head 21F being wedged against said margin at 81, thus providing two points of retaining engagement of the head in the aperture 16, one being the wedging of tooth 29F in its lanced notch in the margin and the other being the pressure engagement of the cylindrical periphery of the head 21F against the margin. Such pressure engagement provides less secure attachment than the tooth 29F. Also, the insert will be very slightly eccentric in the aperture 16. For these reasons, this modification of the invention is less desirable than the others.

FIGS. 13 and 14 disclose a further modification utilizing one or more radial anchor teeth 29G which are relatively low in radial height and relatively wide circumferentially as contrasted to the pointed teeth 29 previously described. As shown in FIG. 14, the teeth 29G, at the underside of head 21G, have wedge-shaped ends 85 providing free entry into the skin sheet aperture 16 and exerting a wedging, compressive action against the skin sheet margin as compared to the notching action of the teeth 29 of FIG. 5, with a very slight indenting of the margin 16 (to an extent which may be in the range as low as .0001 to .001 inch). Such indentation is indicated in somewhat exaggerated degree at 86 in FIG. 13.

FIG. 15 illustrates a further modification of the radial anchor tooth, shown at 29H, which is roughly intermediate between the forms shown in FIG. 5 and FIG. 13. At the inner side of head 21H the teeth 29H may have either the wedging ends shown at 85 in FIG. 14 or sharp-edged squared ends for notching the skin sheet margin in a manner generally similar to that of teeth 29 of FIG. 5.

The modified form of insert shown in FIG. 7 may be utilized, either with the threaded bore 24B, or with a plain cylindrical bore to receive a bolt or rivet.

One of the important advantages of our improved insert and installation is the ease with which they can be utilized in either vertical or overhead panels.

We claim:
1. An insert for installation in a sandwich panel embodying a fragile, low density core sandwiched between spaced skins of solid sheet material, and having a hole beginning with a circular aperture in one of said skins, extending through said core and terminating adjacent the other skin, said insert comprising: a rigid form-retaining mounting head of disc form of a diameter to fit closely within said aperture and having a port therein, and a hollow body of smaller diameter than said head extending axially therefrom and receivable within said core hole, said body having a bore with means to engage a fastener; said head having on its periphery a plurality of anchor teeth substantially equidistantly spaced circumferentially, with circumferential spaces between their bases of considerably greater width than their circumferential base width, and of a radial height related to the diameter of said mounting head by a ratio in the range of (.007–.02):0.5 such as to establish an interlocking temporary supporting engagement therewith, by embedment in said aperture margin in response to axial pressure without warping said margin out of the plane of said one skin, and said hollow body having on its external wall, means for interlocking engagement with a body of potting material filling said hole around said body, so as to resist torque loads applied to said insert by a fastener secured therein.

2. An insert as defined in claim 1, wherein said teeth, at the underside of said head, have sharpened edges for notching said margin.

3. An insert as defined in claim 1, wherein said teeth are relatively wide circumferentially and relatively low radially and have, at their ends adjacent the underside of said head, wedge-shaped ends for free entry into said aperture and for wedging action against the internal wall thereof, causing said mounting teeth to become indented in said inner wall.

4. An insert as defined in claim 1, wherein the periphery of said mounting head is composed of said teeth and a plurality of intervening concentric segmental-circular arcuate surfaces each having a circumferential dimension several times the circumferential base width of said teeth.

5. An insert as defined in claim 1, wherein the periphery of said mounting head is composed of said teeth and a plurality of intervening concentric segmental-circular arcuate surfaces each having a circumferential dimension several times the circumferential base width of said teeth; said mounting teeth being triangular in elevation and having respective chisel edges defining their radially outer extremities.

6. An insert as defined in claim 1, wherein the periphery of said mounting head is composed of said teeth and a plurality of intervening concentric segmental-circular arcuate surfaces each having a circumferential dimension several times the circumferential base width of said teeth; said mounting teeth being triangular in elevation and having respective chisel edges defining their radially outer extremities; said teeth having a radial height related to the radial clearance between said arcuate surfaces and said aperture margin by a ratio in the range of (.007–.02):005.

7. An insert as defined in claim 1, wherein the periphery of said mounting head is composed of said teeth and a plurality of intervening concentric segmental-circular arcuate surfaces each having a circumferential dimension several times the circumferential base width of said teeth; said mounting teeth being triangular in elevation and having respective chisel edges defining their radially outer extremities; said teeth having a radial height not more than twice the radial clearance between said arcuate surfaces and said aperture margin.

8. At insert as defined in claim 1, wherein the periphery of said mounting head is composed of said teeth and a plurality of intervening concentric segmental-circular arcuate surfaces each having a circumferential dimension several times the circumferential base width of said teeth; said mounting teeth being triangular in elevation and having respective chisel edges defining their radially outer extremities: said teeth having a radial height related to the radial clearance between said arcuate surfaces and said aperture margin by a ratio in the range of (.007–.02):005; said anchor teeth being between 3 and 5 in number.

9. An insert as defined in claim 1, wherein the periphery of said mounting head is composed of said teeth and a plurality of intervening concentric segmental-circular arcuate surfaces each having a circumferential dimension several times the circumferential base width of said teeth; said teeth having a radial height related to the radial clearance between said arcuate surfaces and said aperture margin by a ratio in the range of (.007–.2):005.

10. An insert for installation in a sandwich panel embodying a fragile, low density core sandwiched between spaced skins of solid sheet material, and having a hole beginning with a circular aperture in one of said skins, extending through said core and terminating adjacent the other skin, said insert comprising:

a mounting head of disc form of a diameter to fit closely within said aperture and having a port therein;

and a hollow body of smaller diameter than said head extending axially therefrom and receivable within said core hole, said body having a bore with means to engage a fastener;

said head having on its periphery only three anchor teeth substantially equidistantly spaced circumferentially, with circumferential spaces between their bases of greater width than their circumferential base width, of a radial height to slightly intersect the margin of said aperture when said head is received therein, so as to establish an interlocking temporary supporting engagement therewith;

said hollow body having on its external wall, means for interlocking engagement with a body of potting material filling said hole around said body, so as to resist torque loads applied to said insert by a fastener secured therein;

said teeth being triangular in elevation and having respective chisel edges defining their radially outward extremities;

said anchor teeth having a radial height related to the diameter of said mounting head by a ratio in the range of (.007–.02):0.5.

References Cited

UNITED STATES PATENTS

| | | | |
|---|---|---|---|
| 1,405,372 | 1/1922 | White | 52—701 |
| 2,091,882 | 8/1937 | Robinson | 85—83 |
| 2,207,476 | 7/1940 | Bernstein | 85—83 |
| 2,822,014 | 2/1958 | Cummaro | 151—41.73 |
| 2,862,246 | 12/1958 | Sadler et al. | 264—275 |
| 2,912,031 | 11/1959 | Bensinger et al. | 151—41.73 |
| 2,949,142 | 8/1960 | Sumerak | 151—41.73 |
| 3,016,578 | 1/1962 | Rohe | 52—617 |

EDWARD C. ALLEN, *Primary Examiner.*